US009691305B2

(12) United States Patent
Joffer et al.

(10) Patent No.: US 9,691,305 B2
(45) Date of Patent: Jun. 27, 2017

(54) PIXEL INTERLEAVING CONFIGURATIONS FOR USE IN HIGH DEFINITION ELECTRONIC SIGN DISPLAYS

(71) Applicant: Daktronics, Inc., Brookings, SD (US)

(72) Inventors: Brent A. Joffer, Brookings, SD (US); Brett David Wendler, Watertown, SD (US); Glenn P. Luke, Sioux Falls, SD (US); Nathan Lane Nearman, Brookings, SD (US); Chad Neal Gloege, Brookings, SD (US); Matthew Ray Mueller, Brookings, SD (US); Shannon Lee Mutschelknaus, Aurora, SD (US); Joseph Gerard Schulte, Brookings, SD (US); Eric Steven Bravek, Brookings, SD (US); Ryan Mark Hansen, Watertown, SD (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 14/855,748

(22) Filed: Sep. 16, 2015

(65) Prior Publication Data

US 2016/0071442 A1 Mar. 10, 2016

Related U.S. Application Data

(63) Continuation of application No. 14/623,184, filed on Feb. 16, 2015, which is a continuation of application
(Continued)

(51) Int. Cl.
*G09F 9/302* (2006.01)
*G09F 9/33* (2006.01)
(Continued)

(52) U.S. Cl.
CPC ............ *G09F 9/302* (2013.01); *G09F 9/3026* (2013.01); *G09F 9/33* (2013.01); *G09G 3/2003* (2013.01);
(Continued)

(58) Field of Classification Search
CPC .................. G09G 3/2003; G09G 3/32; G09G 2300/0452; G09G 2340/0407;
(Continued)

(56) References Cited

U.S. PATENT DOCUMENTS 3,291,975 A 12/1966 Mccullough et al.
3,594,761 A 7/1971 Boesen
(Continued)

FOREIGN PATENT DOCUMENTS

EP 1202162 A1 5/2002
EP 1699036 A1 9/2006
(Continued)

OTHER PUBLICATIONS

"U.S. Appl. No. 11/271,404, Non-Final Office Action mailed Apr. 13, 2009", 4 pgs.
(Continued)

*Primary Examiner* — Priyank Shah
(74) *Attorney, Agent, or Firm* — Schwegman Lundberg & Woessner, P.A.

(57) ABSTRACT

Pixel interleaving configurations for use in high definition electronic sign displays where each and every scan line includes full red, green, and blue color representation to provide for high resolution electronic video sign displays.

18 Claims, 11 Drawing Sheets

Related U.S. Application Data

No. 14/258,840, filed on Apr. 22, 2014, now abandoned, which is a continuation of application No. 13/547,312, filed on Jul. 12, 2012, now Pat. No. 8,711,067, which is a continuation of application No. 13/359,095, filed on Jan. 26, 2012, now Pat. No. 8,269,700, which is a continuation of application No. 12/217,011, filed on Jul. 1, 2008, now Pat. No. 8,130,175, which is a continuation of application No. 11/786,720, filed on Apr. 12, 2007, now Pat. No. 7,907,133.

(60) Provisional application No. 60/791,808, filed on Apr. 13, 2006.

(51) Int. Cl.
G09G 3/20 (2006.01)
G09G 3/32 (2016.01)
H04N 9/30 (2006.01)

(52) U.S. Cl.
CPC .............. *G09G 3/32* (2013.01); *H04N 9/30* (2013.01); *G09G 2300/0426* (2013.01); *G09G 2300/0452* (2013.01); *G09G 2310/0224* (2013.01); *G09G 2340/0407* (2013.01); *G09G 2340/0428* (2013.01); *G09G 2340/0457* (2013.01); *G09G 2380/06* (2013.01)

(58) Field of Classification Search
CPC ... G09G 2340/0428; G09G 2340/0457; G09G 2310/0224; G09F 9/3026; G09F 9/33; G09F 13/20; G09F 19/22; G09F 21/00
See application file for complete search history.

(56) References Cited

U.S. PATENT DOCUMENTS

| | | | |
|---|---|---|---|
| 4,234,914 A | 11/1980 | Boesen | |
| 4,659,876 A | 4/1987 | Sullivan et al. | |
| 5,020,253 A | 6/1991 | Lie et al. | |
| 5,027,112 A * | 6/1991 | Ross | G09G 3/004 340/815.45 |
| 5,132,674 A | 7/1992 | Bottorf | |
| 5,184,116 A | 2/1993 | Daugherty et al. | |
| 5,198,723 A | 3/1993 | Parker | |
| 5,268,828 A | 12/1993 | Miura | |
| 5,321,417 A | 6/1994 | Voelzke et al. | |
| 5,353,536 A | 10/1994 | Erber et al. | |
| 5,410,328 A | 4/1995 | Yoksza et al. | |
| 5,559,529 A | 9/1996 | Maher | |
| 5,617,657 A | 4/1997 | Kahn | |
| 5,743,610 A | 4/1998 | Yajima et al. | |
| 5,759,044 A | 6/1998 | Redmond | |
| 5,949,581 A | 9/1999 | Kurtenbach et al. | |
| 6,309,074 B1 | 10/2001 | Inbar et al. | |
| 6,314,669 B1 | 11/2001 | Tucker | |
| 6,329,593 B1 | 12/2001 | Yang | |
| 6,414,650 B1 | 7/2002 | Nicholson et al. | |
| 6,661,429 B1 | 12/2003 | Phan | |
| 6,677,918 B2 | 1/2004 | Yuhara et al. | |
| 6,691,443 B1 | 2/2004 | Slayden | |
| D487,779 S | 3/2004 | Rose | |
| 6,705,033 B1 | 3/2004 | Greene et al. | |
| 6,729,054 B1 | 5/2004 | VanderTuin | |
| 6,737,983 B1 | 5/2004 | Temple | |
| 6,741,222 B1 | 5/2004 | Tucker | |
| 6,813,853 B1 | 11/2004 | Tucker | |
| 6,816,389 B1 | 11/2004 | Lutz et al. | |
| 6,831,653 B2 | 12/2004 | Kehlet et al. | |
| 6,926,375 B2 | 8/2005 | Nagamine et al. | |
| 6,966,674 B2 | 11/2005 | Tsai | |
| 6,994,448 B1 | 2/2006 | Gorrell | |
| 7,014,916 B2 | 3/2006 | Tanabe | |
| 7,050,024 B2 | 5/2006 | LeChevalier et al. | |
| 7,055,271 B2 | 6/2006 | Lutz et al. | |
| D526,361 S | 8/2006 | Yasuoka et al. | |
| 7,344,902 B2 | 3/2008 | Basin et al. | |
| 7,355,562 B2 | 4/2008 | Schubert et al. | |
| 7,907,133 B2 | 3/2011 | Joffer et al. | |
| 7,916,156 B2 | 3/2011 | Brown Elliott et al. | |
| 7,928,968 B2 | 4/2011 | Shon et al. | |
| 7,969,456 B2 | 6/2011 | Brown Elliott et al. | |
| 8,130,175 B1 | 3/2012 | Joffer et al. | |
| 8,172,097 B2 | 5/2012 | Nearman et al. | |
| 8,269,700 B2 | 9/2012 | Joffer et al. | |
| 8,350,788 B1 | 1/2013 | Nearman et al. | |
| 8,711,067 B2 | 4/2014 | Joffer et al. | |
| 2002/0059742 A1 | 5/2002 | Okazaki et al. | |
| 2002/0140655 A1 | 10/2002 | Liang et al. | |
| 2003/0058191 A1 * | 3/2003 | Yuhara | G09F 9/33 345/44 |
| 2003/0217495 A1 | 11/2003 | Nagamine et al. | |
| 2004/0046721 A1 | 3/2004 | Yang | |
| 2004/0130536 A1 | 7/2004 | Tanabe | |
| 2004/0150651 A1 | 8/2004 | Phan | |
| 2004/0164936 A1 | 8/2004 | Lim | |
| 2005/0081414 A1 | 4/2005 | Lutz et al. | |
| 2005/0259418 A1 | 11/2005 | Callegari et al. | |
| 2006/0055642 A1 * | 3/2006 | Daughenbaugh | G09F 9/33 345/82 |
| 2006/0092162 A1 | 5/2006 | Deering et al. | |
| 2006/0105485 A1 | 5/2006 | Basin et al. | |
| 2006/0232525 A1 | 10/2006 | Chou et al. | |
| 2008/0048200 A1 | 2/2008 | Mueller et al. | |
| 2008/0078733 A1 | 4/2008 | Nearman et al. | |
| 2008/0141570 A1 | 6/2008 | Nearman et al. | |
| 2008/0225143 A1 | 9/2008 | Joffer et al. | |
| 2011/0163942 A1 | 7/2011 | Joffer et al. | |
| 2011/0175888 A1 | 7/2011 | Joffer et al. | |
| 2012/0119980 A1 | 5/2012 | Joffer et al. | |
| 2012/0274675 A1 | 11/2012 | Joffer et al. | |
| 2014/0313238 A1 | 10/2014 | Joffer et al. | |
| 2015/0228208 A1 | 8/2015 | Joffer et al. | |

FOREIGN PATENT DOCUMENTS

| | | |
|---|---|---|
| JP | 20050275178 A | 10/2005 |
| WO | WO-91/08565 A1 | 6/1991 |

OTHER PUBLICATIONS

"U.S. Appl. No. 11/271,404, Preliminary Amendment filed Nov. 10, 2005", 11 pgs.

"U.S. Appl. No. 11/271,404, Response filed Jan. 7, 2009 to Restriction Requirement mailed Jan. 2, 2009", 12 pgs.

"U.S. Appl. No. 11/271,404, Restriction Requirement filed Jan. 2, 2009", 5 pgs.

"U.S. Appl. No. 11/642,221, Final Office Action mailed Dec. 17, 2009", 6 pgs.

"U.S. Appl. No. 11/642,221, Non-Final Office Action mailed Mar. 16, 2009", 5 pgs.

"U.S. Appl. No. 11/642,221, Notice of Allowance mailed Nov. 28, 2011", 7 pgs.

"U.S. Appl. No. 11/642,221, Preliminary Amendment mailed Feb. 28, 2007", 9 pgs.

"U.S. Appl. No. 11/642,221, Response filed Apr. 15, 2010 to Final Office Action mailed Dec. 17, 2009", 10 pgs.

"U.S. Appl. No. 11/642,221, Response filed Aug. 10, 2009 to Non Final Office Action mailed Mar. 16, 2009", 9 pgs.

"U.S. Appl. No. 11/786,720, Non-Final Office Action mailed Jun. 24, 2010", 9 pgs.

"U.S. Appl. No. 11/786,720, Notice of Allowance mailed Nov. 16, 2010", 6 pgs.

"U.S. Appl. No. 11/786,720, Preliminary Amendment filed Mar. 18, 2008", 12 pgs.

"U.S. Appl. No. 11/786,720, Preliminary Amendment filed Nov. 9, 2009", 10 pgs.

"U.S. Appl. No. 11/786,720, Response filed Sep. 24, 2010 to Non Final Office Action mailed Jun. 24, 2010", 10 pgs.

(56) References Cited

OTHER PUBLICATIONS

"U.S. Appl. No. 12/217,003, Final Office Action mailed Jan. 6, 2012", 26 pgs.
"U.S. Appl. No. 12/217,003, Non Final Office Action mailed Aug. 5, 2011", 23 pgs.
"U.S. Appl. No. 12/217,003, Notice of Allowance mailed Aug. 31, 2012", 8 pgs.
"U.S. Appl. No. 12/217,003, Preliminary Amendment filed Sep. 2, 2008", 3 pgs.
"U.S. Appl. No. 12/217,003, Response filed Jun. 29, 2012 to Final Office Action mailed Jan. 6, 2012", 17 pgs.
"U.S. Appl. No. 12/217,003, Response filed Oct. 14, 2011 to Non Final Office Action mailed Aug. 5, 2011", 17 pgs.
"U.S. Appl. No. 12/217,011, Non Final Office Action mailed Aug. 10, 2011", 13 pgs.
"U.S. Appl. No. 12/217,011, Notice of Allowance mailed Oct. 27, 2011", 8 pgs.
"U.S. Appl. No. 12/217,011, Preliminary Amendment filed Sep. 2, 2008", 6 pgs.
"U.S. Appl. No. 12/217,011, Response filed Oct. 7, 2011 to Non Final Office Action mailed Aug. 10, 2011", 8 pgs.
"U.S. Appl. No. 13/047,193, Response filed Jul. 29, 2013 to Final Office Action mailed May 30, 2013", 12 pgs.
"U.S. Appl. No. 13/047,193, Response filed Feb. 1, 2012 to Final Office Action mailed Nov. 25, 2011", 14 pgs.
"U.S. Appl. No. 13/047,193, Advisory Action mailed Aug. 8, 2013", 3 pgs.
"U.S. Appl. No. 13/047,193, Final Office Action mailed May 30, 2013", 14 pgs.
"U.S. Appl. No. 13/047,193, Final Office Action mailed Nov. 25, 2011", 15 pgs.
"U.S. Appl. No. 13/047,193, Non Final Office Action mailed Aug. 30, 2011", 15 pgs.
"U.S. Appl. No. 13/047,193, Non Final Office Action mailed Sep. 28, 2012", 13 pgs.
"U.S. Appl. No. 13/047,193, Response filed Jan. 17, 2013 to Non Final Office Action mailed Sep. 28, 2012", 13 pgs.
"U.S. Appl. No. 13/047,193, Response filed Nov. 1, 2011 to Non Final Office Action mailed Aug. 30, 2011", 15 pgs.
"U.S. Appl. No. 13/076,857, Final Office Action mailed May 23, 2013", 22 pgs.
"U.S. Appl. No. 13/076,857, Final Office Action mailed Nov. 10, 2011", 17 pgs.
"U.S. Appl. No. 13/076,857, Non Final Office Action mailed Aug. 20, 2012", 17 pgs.
"U.S. Appl. No. 13/076,857, Non Final Office Action mailed Aug. 22, 2011", 17 pgs.
"U.S. Appl. No. 13/076,857, Response filed Jan. 10, 2013 to Non-Final Office Action mailed Aug. 20, 2012", 15 pgs.
"U.S. Appl. No. 13/076,857, Response filed Jan. 23, 2012 to Final Office Action mailed Nov. 10, 2011", 13 pgs.
"U.S. Appl. No. 13/076,857, Response filed Nov. 1, 2011 to Non Final Office Action mailed Aug. 22, 2011", 15 pgs.
"U.S. Appl. No. 13/359,095, Notice of Allowance mailed Apr. 12, 2012", 10 pgs.
"U.S. Appl. No. 13/547,312, Response filed Nov. 15, 2013 to Non Final Office Action mailed Sep. 13, 2013", 10 pgs.
"U.S. Appl. No. 13/547,312, Advisory Action mailed Jun. 4, 2013", 3 pgs.
"U.S. Appl. No. 13/547,312, Advisory Action mailed Jul. 12, 2013", 3 pgs.
"U.S. Appl. No. 13/547,312, Final Office Action mailed Apr. 26, 2013", 16 pgs.
"U.S. Appl. No. 13/547,312, Non Final Office Action mailed Sep. 13, 2013", 15 pgs.
"U.S. Appl. No. 13/547,312, Non Final Office Action mailed Sep. 20, 2012", 15 pgs.
"U.S. Appl. No. 13/547,312, Notice of Allowance mailed Dec. 9, 2013", 12 pgs.
"U.S. Appl. No. 13/547,312, Response filed May 24, 2013 to Final Office Action mailed Apr. 26, 2013", 14 pgs.
"U.S. Appl. No. 13/547,312, Response filed Jun. 20, 2013 to Advisory Action mailed Jun. 4, 2013", 14 pgs.
"U.S. Appl. No. 13/547,312, Response filed Dec. 20, 2012 to Non Final Office Action mailed Sep. 20, 2012", 20 pgs.
"U.S. Appl. No. 14/258,840, Non Final Office Action mailed Sep. 16, 2014", 38 pgs.
"U.S. Appl. No. 14/258,840, Preliminary Amendment filed 08-26-24", 6 pgs.
"U.S. Appl. No. 14/623,184, Non Final Office Action mailed Jun. 16, 2015", 10 pgs.
"European Application Serial No. 07862836.9, Supplementary European Search Report mailed Feb. 7, 2012", 6 pgs.
"European Application Serial No. 08742865.2, Communication pursuant to Rules 70(2) and 70a(2) EPC dated Aug. 23, 2010", 1 pg.
"European Application Serial No. 08742865.2, Examination Notification Art. 94(3) mailed Dec. 1, 2014", 4 pgs.
"European Application Serial No. 08742865.2, Extended European Search Report mailed Aug. 4, 2010", 7 pgs.
"European Application Serial No. 08742865.2, Response filed Feb. 23, 2011 to Communication dated Aug. 23, 2010", 13 pgs.
"International Application Serial No. PCT/US06/36683, International Preliminary Report on Patentability completed Oct. 10, 2008", 6 pgs.
"International Application Serial No. PCT/US06/36683, International Search Report mailed Aug. 9, 2007", 1 pg.
"International Application Serial No. PCT/US06/36683, Written Opinion mailed Aug. 9, 2007", 4 pgs.
"International Application Serial No. PCT/US07/25456, International Search Report mailed Apr. 16, 2008", 1 pg.
"International Application Serial No. PCT/US07/25456, Written Opinion mailed Apr. 16, 2008", 4 pgs.
"International Application Serial No. PCT/US08/04808, International Search Report mailed Jul. 30, 2008", 2 pgs.
"International Application Serial No. PCT/US08/04808, Written Opinion mailed Jul. 30, 2008", 4 pgs.

* cited by examiner
PIXEL INTERLEAVING CONFIGURATIONS FOR USE IN HIGH DEFINITION ELECTRONIC SIGN DISPLAYS

CROSS REFERENCES TO RELATED APPLICATIONS

This application is a continuation of and claims the benefit of priority under 35 U.S.C. §120 to U.S. patent application Ser. No. 14/623,184 filed on Feb. 16, 2015, entitled "Pixel Interleaving Configurations For Use In High Definition Electronic Sign Displays," which is a continuation of and claims the benefit of priority under 35 U.S.C. §120 to U.S. patent application Ser. No. 14/258,840 filed on Apr. 22, 2014, entitled "Pixel Interleaving Configurations For Use In High Definition Electronic Sign Displays," which is a continuation of and claims the benefit of priority under 35 U.S.C. §120 to U.S. patent application Ser. No. 13/547,312 filed on Jul. 12, 2012, entitled "Pixel Interleaving Configurations For Use In High Definition Electronic Sign Displays," issued as U.S. Pat. No. 8,711,067 on Apr. 29, 2014, which is a continuation of and claims the benefit of priority under 35 U.S.C. §120 to U.S. patent application Ser. No. 13/359,095 filed on Jan. 26, 2012, entitled "Pixel Interleaving Configurations For Use In High Definition Electronic Sign Displays," issued as U.S. Pat. No. 8,269,700 on Sep. 18, 2012, which is a continuation of and claims the benefit of priority under 35 U.S.C. §120 to U.S. patent application Ser. No. 12/217,011 filed on Jul. 1, 2008, entitled "Pixel Interleaving Configurations For Use In High Definition Electronic Sign Displays," issued as U.S. Pat. No. 8,130,175 on Mar. 6, 2012, which is a continuation-in-part (CIP) of and claims the benefit of priority under 35 U.S.C. §120 to U.S. patent application Ser. No. 11/786,720 filed on Apr. 12, 2007, entitled "Pixel Interleaving Configuration for Use in High Definition Electronics Sign Displays," issued as U.S. Pat. No. 7,907,133 on Mar. 15, 2011, which claims the benefit of priority to U.S. Provisional Patent Application Ser. No. 60/791,808 filed on Apr. 13, 2006, entitled "Interleaved Pixel Concept (SMD-style LEDs)," the benefit of priority of each of which is claimed hereby, and each of which are incorporated by reference herein in its entirety.

This patent application is related to patent application Ser. No. 11/642,221 filed on Dec. 20, 2006, entitled "LED Display Module", which is pending, and which is a continuation of patent application Ser. No. 11/271,404 filed Nov. 10, 2005, entitled "Modular Display System", which is pending.

BACKGROUND OF THE INVENTION

Field of the Invention

The present invention to electronic sign displays and, more particularly relates to pixel interleaving configurations for use in high definition electronic sign displays.

Description of the Prior Art

Prior art electronic sign displays have often incorporated a plurality of light emitting diodes (LEDs) as a prime emitter of light or points of light, whereby visual perception is processed by the eye of a viewer as a graphic presentation. Electronic sign displays have evolved from those having moderate resolution to those having an improved degree of resolution approaching or equaling high definition video, such as brought on by the advent of high definition (HD) television devices. There is a desire for high definition, i.e., high resolution, indoor or outdoor LED displays reflecting the current trend in the ever increasing quest for picture-like FED video quality. There are two primary standards for HD video, one is 720p and the other is 1080i. The 720p standard uses 720 progressively scanned lines of multiple pixel groups of full color red, green and blue (RGB) LEDs, where each RGB LED group constitutes a single pixel that collectively create a video image frame for accumulated perception as an image by the human eye. For example, a progressive scan could use 1/60th of a second for each frame. The other standard is the 1080i standard, that supports 1080 lines of resolution by interleaved scanning. In interleaved scanning, the odd lines are illuminated for 1/60th of a second followed by the even scan lines for 1/60th of a second, giving a full frame of data in 1/30th of a second. Each video standard is independent of the light emitting technology, and therefore can be supported by CRT (cathode ray tube), LCD (liquid crystal displays), plasma, or LEDs (light emitting diodes). Light emitting diode displays are often the preferred technology for large video displays because they are capable of creating a high contrast, bright display. Producing such high resolution light emitting displays requires the addition of LEDs where the quantity of LEDs are increased in great quantity to achieve desired clarity, resolution, definition and brightness. Because every pixel in those lines of resolution has a red, green, and blue component associated with it, every pixel should have a red, green, and blue LED to display all the video information available for that pixel element. LEDs are a very significant percentage of the cost of an LED screen, and therefore, a screen with 720 pixels high by some arbitrary number of pixels wide can be extremely expensive and, therefore, cost prohibitive for many users. Such an increase in the number of LEDs required for high definition resolution use can be problematic in terms of LED cost and in terms of energy usage. Size limitations are also a cause of concern. There are two approaches with respect to LED structuring when building a high definition electronic sign display. One approach uses a plurality of individual LEDs were each LED is an individual colored red, green, and blue LED, thereby forming a pixel. The physical size of these lamps along with the requirement to have at least three LEDs (red, green, and blue) limits how tightly the spacing can be between full color pixel elements. Alternatively, these lamp-style LEDs can be inserted through the circuit board as part of an LED package directly affixed to the face of the circuit board. This second approach is a surface mount device (SMD) package that preferably includes red, green, and blue LEDs in one package. Combining all three color diodes into such a single SMD LED package allows for tighter pixel spacing and is limited only by the size of the SMD package itself. In addition to typical video format displays, there are many applications pertaining to vertically small but very long displays. Some examples of these applications include financial ticker displays, or programmable electronic advertising displays, such as Daktronics, Inc. ProAd® product often found in stadiums and arenas. These displays are often between 1-4 feet tall, but can be tens or even hundreds of feet long. Vertical pixel resolution has a significant impact on the image quality of these displays and is beneficial to advertisers who want a high quality image when they are paying to advertise their product/company through the use of such a device. Clearly what is desired is a solution addressing the shortcomings of prior art devices where such a solution is introduced by the present invention.

SUMMARY OF THE INVENTION

The general purpose of the present invention is to provide pixel interleaving configurations for use in high definition electronic sign displays. The invention includes one or more red, green, and blue LED pixel configurations that are useful for optimizing the vertical resolution of LED video displays, especially high definition electronic sign displays. The following are key features or attributes of the invention:

1. Any pixel has at least 1 red, 1 green, and 1 blue (RGB) light emitting diode to form a hill color element, but may be in different or varying configurations or native pixel arrangements, such as, but not limited to, the following basic configurations, whereby a pixel includes either: (a) individual LEDs including a grouping preferably of at least one red LED, one green LED, and one blue LED elements consisting of solely vertical LED alignment or consisting of triangular alignment or any other suitable arrangement; or (b) SMD (Surface Mount Device) LED packages of multiple elements including one red LED, one green LED, and one blue LED being closely grouped therein preferably in chevron (triangular alignment) style or other suitable arrangement.

2. There are odd and even lines of pixels. The even lines are horizontally offset from the odd lines to allow for tighter vertical pixel spacing while using either three individual (separate) red, green, blue LEDs or while using SMD LED packages according to 1. above.

3. The LED spacing within an individual LED (red, green, blue) style pixel or spacing from pixel-to-pixel can be flexible. Spacing of the LEDs may be compacted within the pixel to ease manufacturing and, as such, pixel boundaries can easily be visually seen and identified), or uniform spacing can be used to create an even fill-factor across the LED sign where the pixel boundaries blend together, preferably making it difficult to visually identify which individual LEDs belong with which pixel.

4. Pixel arrangements are scaleable as the pixel pitch between interleaved 3-in-1 SMD LED package pixels or separate red, green, blue SMD pixels is not limited to designs at 4 mm, 1.25 mm, 25 mm and the like, but can be implemented on any pitch between the pixels. This scaleability allows this invention to be used to develop a family of devices with a wide ranging offering of pixel spacing that can be used to build a sign format with the optimal viewing properties for any display applications.

According to one or more embodiments of the present invention, there are provided pixel interleaving configurations for use in high definition electronic sign displays where each scanned pixel includes a full complement of colored LEDs including the colors of red, green, and blue.

One significant aspect and feature of the present invention is an interleaved display where each scanned pixel includes red, green, and blue representation.

Another significant aspect and feature of the present invention is the offset of a succeeding line of pixels with a previous line of pixels.

Still another significant aspect and feature of the present invention is the reduction in the number of LEDs required in an electronic sign display by the use of interleaving of pixels while still maintaining a balanced and full red, green, and blue color representation in each scan row, often referred to as full color rows of resolution.

Yet another significant aspect and feature of the present invention is the use of pure pixel display concepts instead of virtual or dynamic pixeling.

A further significant aspect and feature of the present invention is the use of full color row resolution which does not experience color shift, which upholds high image and color quality, and which maintains high definition capabilities.

A still further significant aspect and feature of the present invention is that full color pixel content is provided for even use of the LEDs, whereby all LEDs age at an even rate.

A still further significant aspect and feature of the present invention decreases LED density while maintaining the number of full color resolution rows.

A further significant aspect and feature of the present invention prevents side angle color shift that occurs when LEDs are packed very closely together.

Having thus briefly described embodiments of the present invention and having mentioned some significant aspects and features of the present invention, it is the principal object of the present invention to provide pixel interleaving configurations for use in high definition electronic sign displays.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
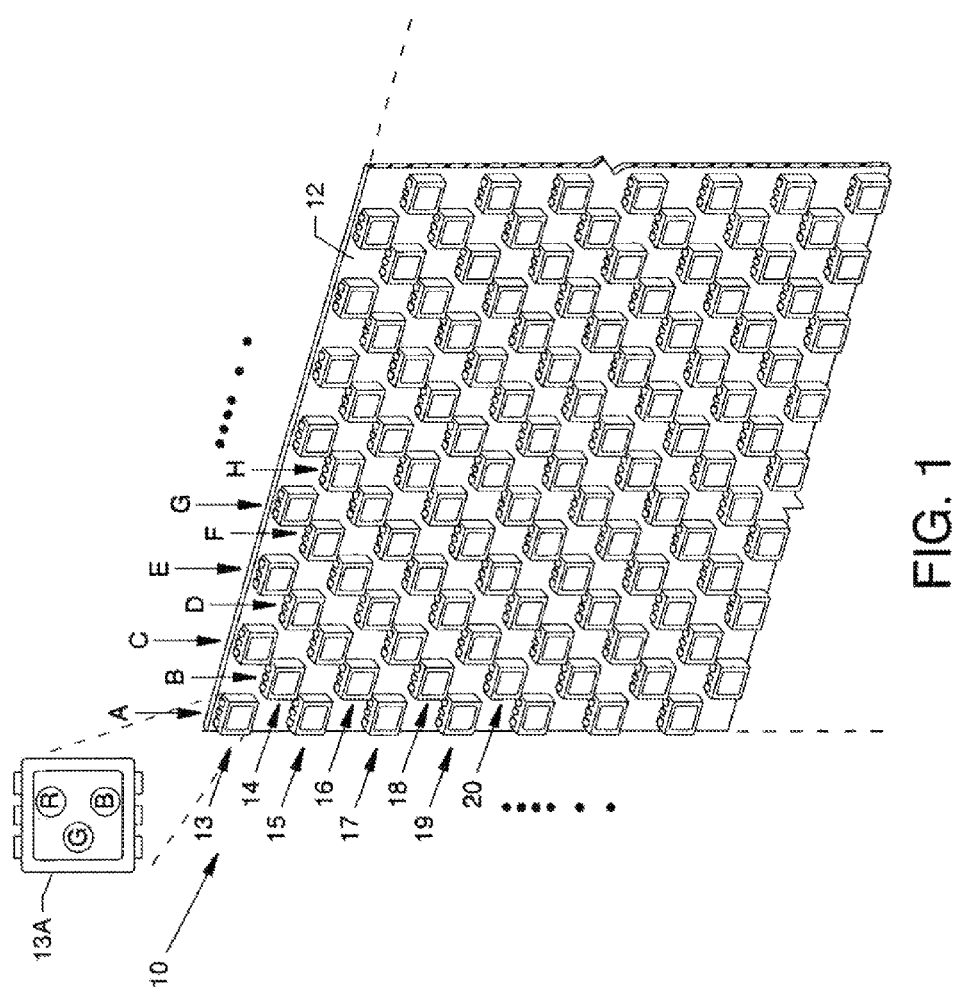
FIG. 1 is a segmented view showing a pixel interleaving configuration for use in high definition electronic sign displays, the present invention.

FIG. 1 is a segmented view showing a pixel interleaving configuration 10 for use in high definition electronic sign displays where a plurality of LED packages are arranged and mounted on a circuit board 12 which can be part of a high definition electronic sign display. The LED packages, each of which are a pixel, are arranged in alternating style having odd numbered rows 13, 15, 17, 19, and so on, alternating with even numbered rows 14, 16, 18, 20, and so on, where the even numbered rows 14, 16, 18, 20, and so on, are offset from the odd numbered rows 13, 15, 17, 19, and so on. Correspondingly, the LED packages are arranged in alternating style having columns A, C, E and G, and so on, alternating with columns B, D, F, H, and so on, where the columns B, D, F and H are offset from the columns A, C, E and G, and so on. The LED packages can be identified according to row and column. For example, the upper left LED package would be LED package 13A, the LED package beneath would be LED package 15A, and so on. An enlarged copy of the LED package 13A is shown distanced from the other LED packages. The LED package 13A and each of the other similar LED packages are a pixel, each including LED elements which can be generally smaller than individual LEDs which are a red LED, a green LED, and a blue LED indicated by the letters R. G and B arranged in chevron or triangular style or other suitable style.

Figure 2:
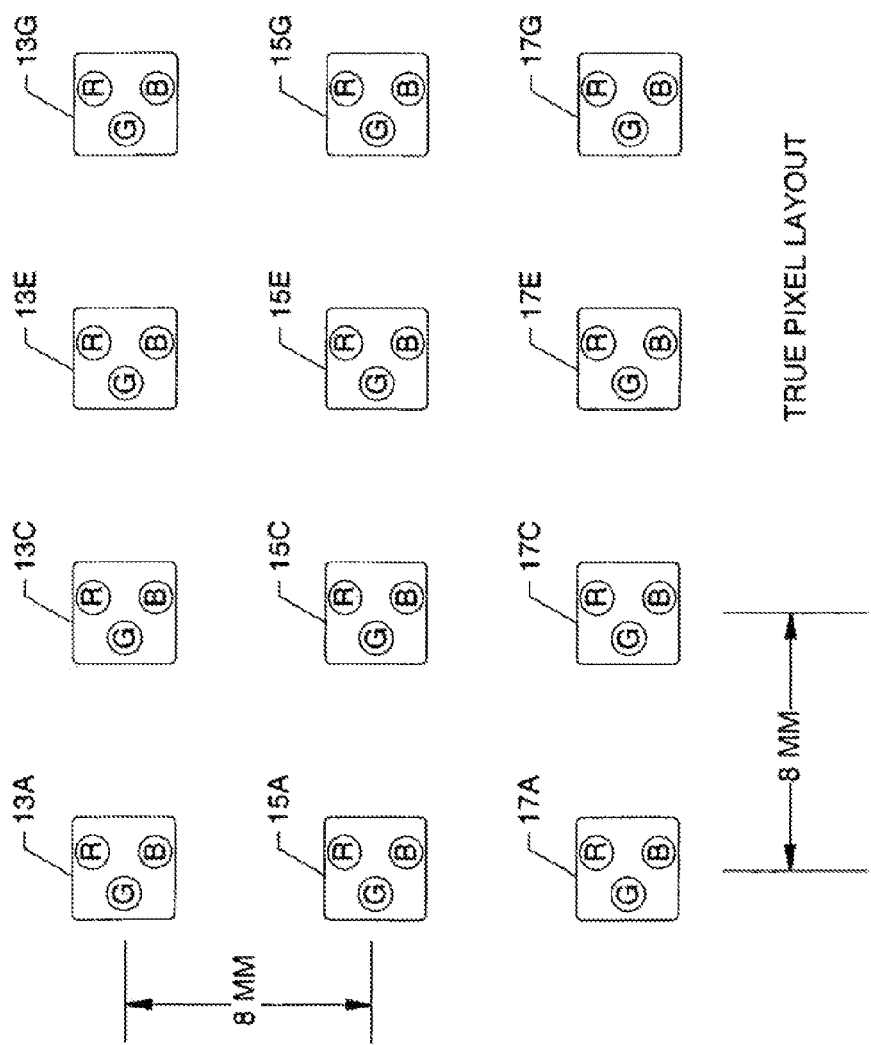
FIG. 2 and FIG. 3 are an overview demonstrating the concept of interleaving of pixels showing the use of LED packages (pixels) such as described and arranged in FIG. 1.
Figure 3:
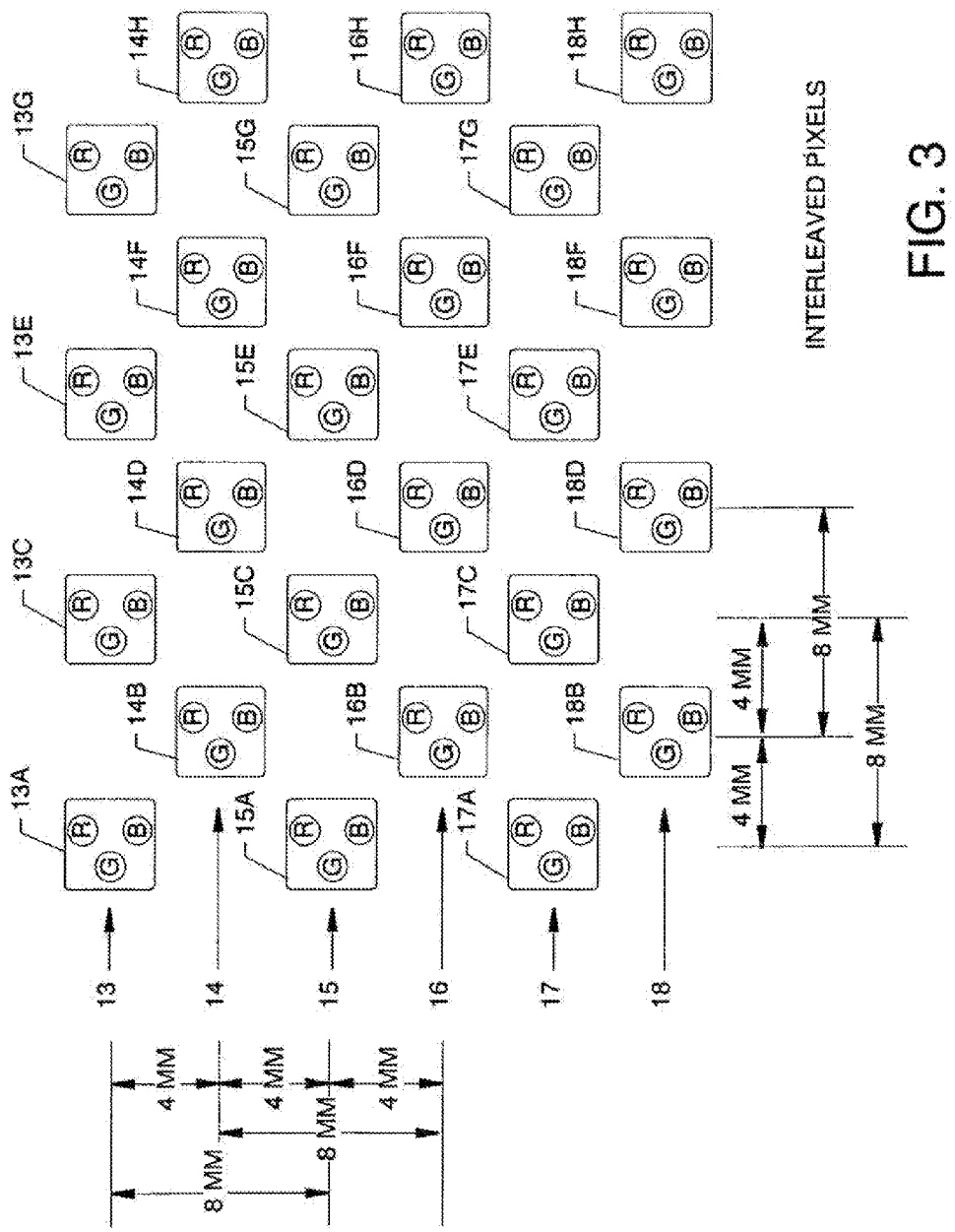
Figure 4:
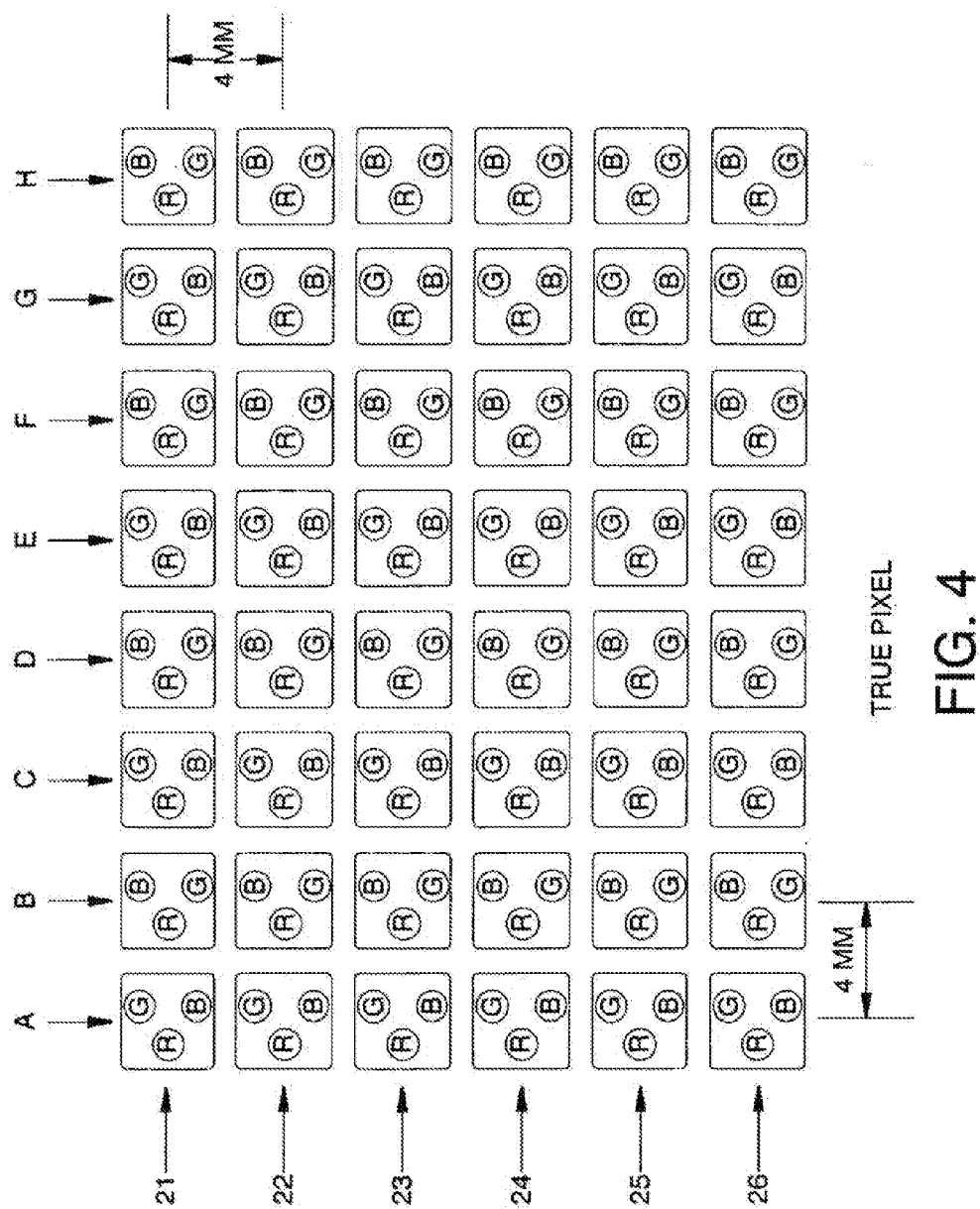
FIG. 4 shows LED packages (pixels) arranged in true pixel configuration.

FIG. 2 and FIG. 3 are used for an overview demonstrating the concept of interleaving pixels showing the use of LED packages (pixels), such as described and arranged in FIG. 1. For example, and as in FIG. 2, starting with a true pixel layout, LED packages 13A, 13C, 13E, 13G, 15A, 15C, 15E, 15G, 17A, 17C, 17E, and 17G are distributed with the center of each aligned on vertical and horizontal 8 mm centers, thus creating pixels spaced at 8 mm. A proportionate number of additional pixels 14B, 14D, 14F, 14H, 16B, 16D, 16F, 16H, 18B, 18D, 18F and 18H (FIG. 3) are then interleavingly distributed in uniform fashion as shown in FIG. 3, substantially between or suitably spaced as illustrated with reference to LED packages 13A, 13C, 13E, 13G, 15A, 15C, 15E, 15G, 17A, 17C, 17E, and 17G in alignment with other and additional offset vertical and horizontal 8 mm centers resulting in another 8 mm spaced interleaved pixel arrangement, where the term "pixel interleaving" or "interleaved" is in preferred use by Daktronics, Inc. of Brookings, S. Dak. More precisely, LED package 14B is centrally located in the space below LED packages 13A and 13C and above LED packages 15A and 15C, the LED package 16B is centrally located in the space below LED packages 15A and 15C and above LED packages 17A and 17C, and so on in the same fashion. Other LED packages are not shown for the purpose of brevity and clarity. Such an arrangement of LED packages (pixels) results in an interleaved arrangement of LED packages (pixels) with 4 mm vertical and horizontal spacing. By using positional pixel processing, that processes the signal in relation to the location of the pixel, the colors blend with their own pixel but the viewer's eyes also blend with the color produced by a neighboring pixel. With this type of interleaved layout combined with positional pixeling technology, which can also be referred to as "pure pixel", a term which is in preferred use by Daktronics, Inc. of Brookings, S. Dak., each and every pixel and, therefore, each and every scan line is full color resulting in a blend of efficiency and accuracy having the capability to reproduce all the color depth and detail present in the original image signal. In the illustration provided by FIG. 3, 24 LED packages using interleaved "pure pixel" design are used, whereas 48 LED packages are used in the illustration provided in FIG. 4 using a non-interleaved "true pixel" design, a term which is in preferred use by Daktronics, Inc. of Brookings, S. Dak., obviously providing an economical solution to pixel quantity where, in FIG. 4, LED packages (pixels) are shown arranged in rows 21 through 26 and columns A through H. Such economy is more significant when comparing larger high definition electronic sign displays. For example, such an interleaving using the 4 mm interleaved pixel spacing of FIG. 3 requires 3,906 LED packages using interleaved pixel design to populate a one square meter high definition electronic sign display which, significantly, is half of the 7,812 LED packages required to populate a "true pixel" high definition electronic sign display represented in FIG. 4 having 4 mm a pixel spacing. Such interleaved configurations can be scaled to larger spacings. For instance, larger LED packages (pixels) having correspondingly larger LEDs or individual red, green, and blue LEDs in groups (pixels) can be scaled upwardly to include, for example, 8 mm, 12.5 mm, 16 mm and the like. For example, a pure pixel (interleaved) design having 12.5 mm spacing using individual LEDs would require the use of 3200 red LEDs, 3200 green LEDs, and 3200 blue LEDs to populate a one square meter high definition electronic sign display, whereas a "true pixel" design having 12.5 mm spacing would required the use of 6400 red LEDs, 6400 green LEDs, and 6400 blue LEDs to populate a one square meter high definition electronic sign display.

Figure 5:
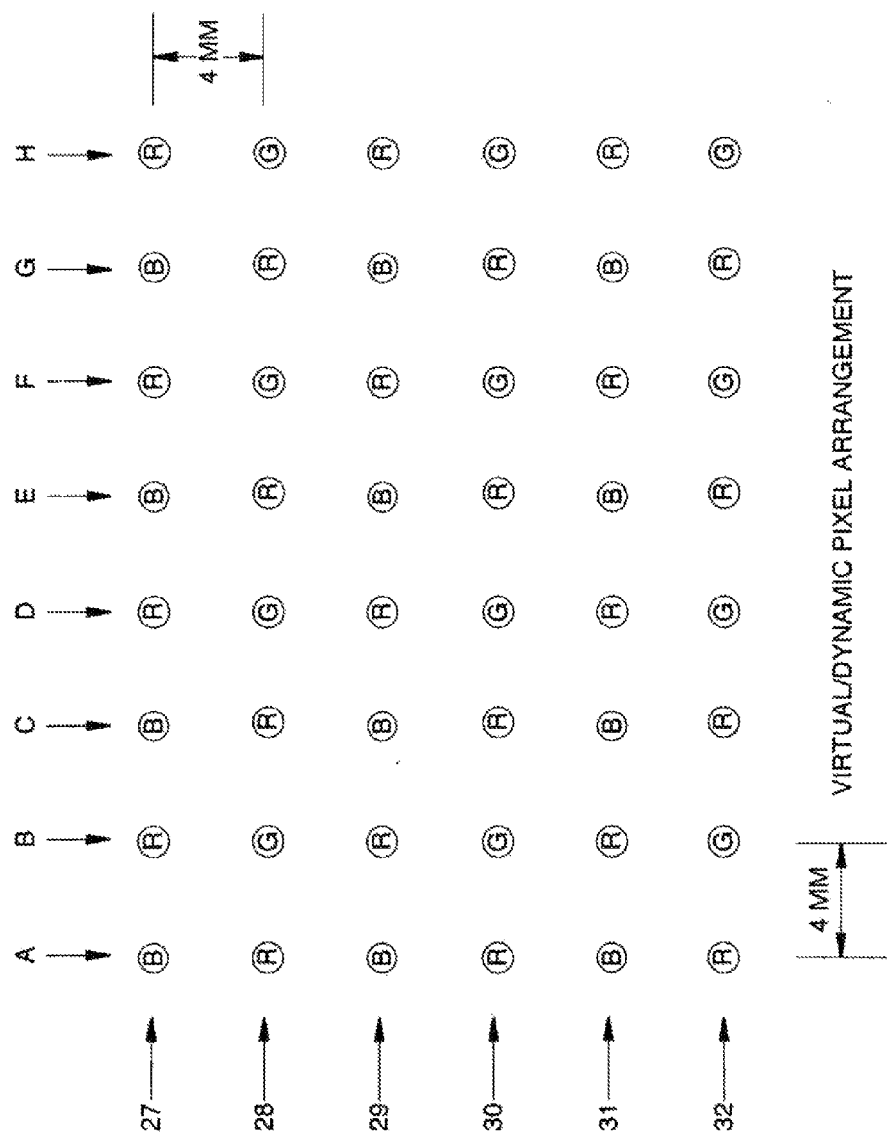
FIG. 5 for the sake of comparison shows a prior art virtual/dynamic pixel arrangement incorporating single colored LEDs which form pixels accounted for in various configuration designations such as known in the art.

For comparison, FIG. 5 shows a prior art virtual/dynamic pixel arrangement incorporating single colored LEDs which form pixels which can be accounted for in various configuration designations, such as known in the art where single colored LEDs are arranged in rows 27 through 32 and columns A through H of 4 mm vertical and horizontal spacing. Use of the interleave pixel spacing as described in FIG. 3 provides for scans involving the availability of red, green, and blue elements for use in each scan line. For example, a scan of line 13 of FIG. 3 involves the availability of four red LED elements, four green LED elements, and four blue LED elements of the LED packages 13A, 13C, 13E and 13G, whereas a scan of a corresponding line 27 of FIG. 5 involves the availability of four red LEDs, zero green LEDs, and four blue LEDs where green LEDs are under-represented, i.e., nonexistent. In a similar fashion, a scan of line 14 of FIG. 3 involves the availability of four red LED elements, four green LED elements, and four blue LED elements of the LED packages 14B, 14D, 14F and 14H, whereas a scan of a corresponding line 28 of FIG. 5 involves the availability of four red LEDs, four green LEDs, and zero blue LEDs where blue LEDs are under-represented, i.e., nonexistent. Additional following scan patterns repeatingly exhibit the same characteristics where a shortage of green and blue color representation exists with reference to the scan lines of the virtual/dynamic pixel arrangement shown in FIG. 5 and where, preferably, an even and balanced red, green, and blue color representation exists with reference to the scan lines of the interleaved pixel arrangement shown in FIG. 3. It is noted that the interleaved pixel arrangement of FIG. 3, like the "true pixel" arrangement of FIG. 4, includes scan lines of full color representation.

Figure 6:
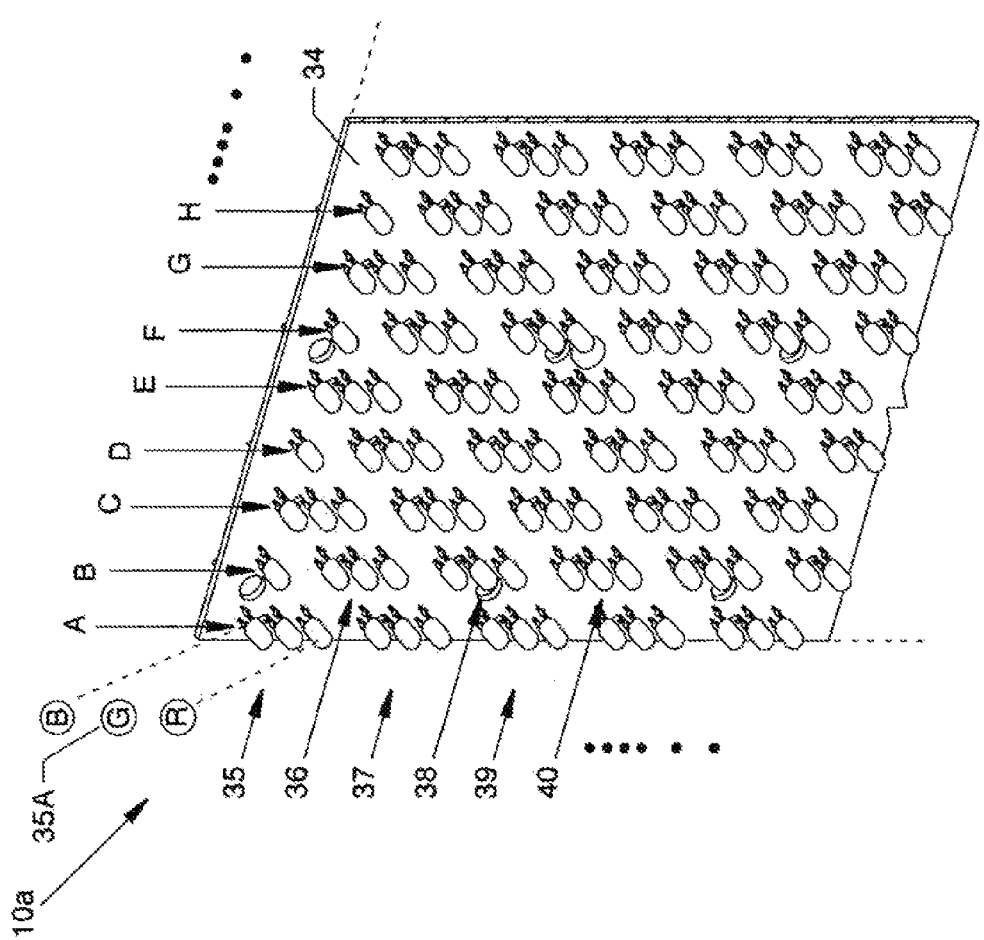
FIG. 6 is a segmented view showing a pixel interleaving configuration for use in high definition electronic sign displays where a plurality of individual LEDs form pixels.

FIG. 6 is a segmented view showing a pixel interleaving configuration 10a for use in high definition electronic sign displays where a plurality of individual LEDs form pixels which are arranged for use on a circuit board 34 which can be part of a high definition electronic sign display. Each pixel consists of an individual red LED, an individual green LED, and an individual blue LED in vertical alignment where the pixels are arranged in alternating style having odd numbered rows 35, 37, 39 and so on alternating with even numbered rows 36, 38, 40 and so on where the even numbered rows 36, 38, 40 are offset from the odd numbered rows 35, 37, 39. Correspondingly, the pixels are arranged in alternating style having columns A, C, E, G and so on alternating with columns B, D, F, H and so on where the columns B, D, F, H are offset with respect to the columns A, C, E, G, whereby the pixels can be identified according to row and column. For example, the upper left pixel would be pixel 35A, the pixel beneath would be pixel 37A and so on. An enlarged copy of the pixel 35A is shown distanced from the other pixels. The pixel 35A and each of the other pixels are similar in construction.

Figure 7:
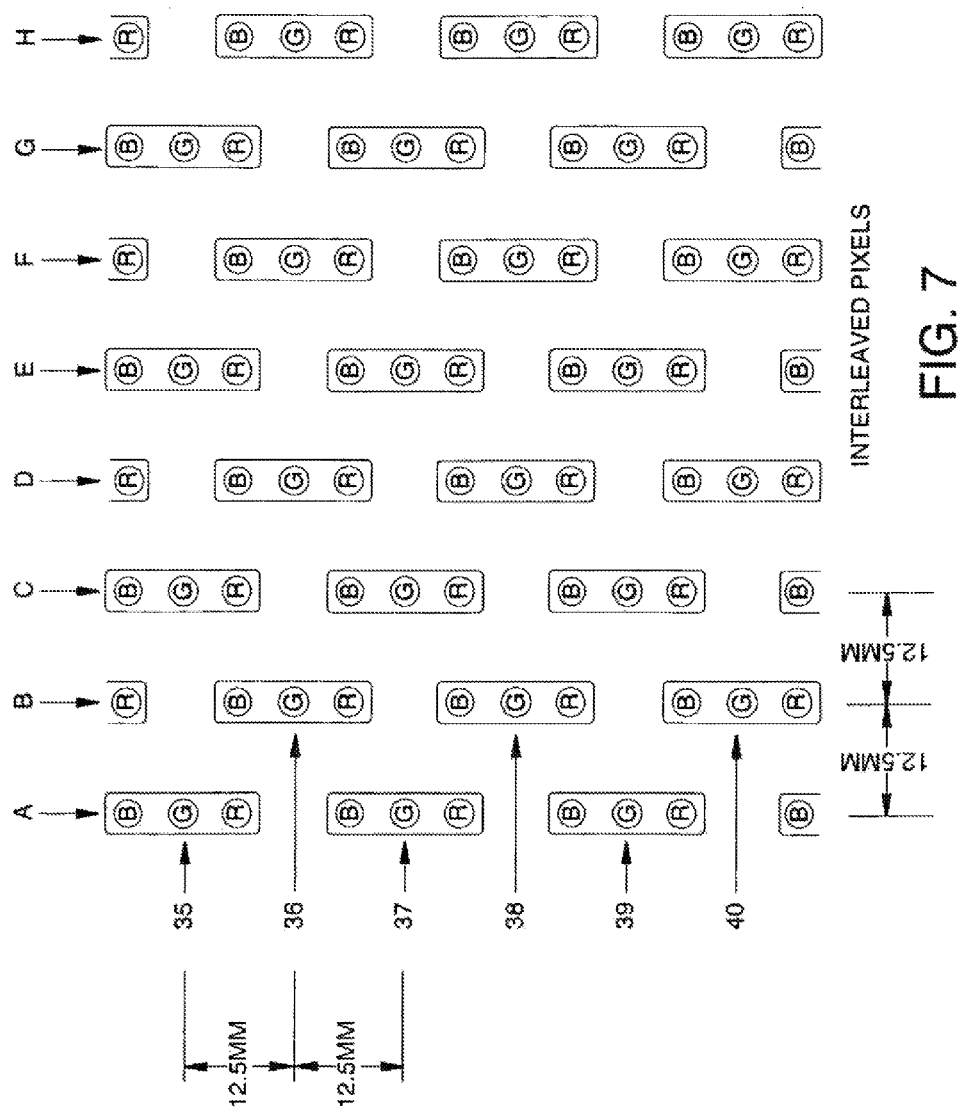
FIG. 7 is an illustration showing interleaving of pixels comprised of individual LEDs such as described and arranged in FIG. 6.

FIG. 7 is an illustration showing interleaving of pixels comprised of individual LEDs, such as described and arranged in FIG. 6. For example, and as in FIG. 6, pixels 35A, 35C, 35E, 35G, 37A, 37C, 37E, 37G, 39A, 39C, 39E, and 39G are distributed with the center of each (a green LED) aligned on vertical and horizontal 12.5 mm centers thus creating pixels spaced at 12.5 mm. A proportionate number of additional pixels 36B, 36D, 36F, 36H, 38B, 380, 38F, 38H, 40B, 40D, 40F and 40H are interleavingly distributed in uniform fashion substantially between or suitably spaced as illustrated with reference to pixels 35A, 35C, 35E, 35G, 37A, 37C, 37E, 37G, 39A, 39C, 39E, and 39G in alignment with other and additional offset vertical and horizontal 12.5 mm centers resulting in an 12.5 mm spaced interleaved pixel arrangement, where the term "pixel interleaving" or "interleaved" is in preferred use by Daktronics, Inc. of Brookings, S. Dak. More precisely, pixel 36B is centrally located in the space below pixels 35A and 35C and above pixels 37A and 37C, the pixel 38E is centrally located in the space below LED pixels 37A and 37C and above pixels 39A and 39C and so on in a suitable fashion. Other pixels are not shown for the purpose of brevity and clarity. Such an arrangement of pixel results in an interleaved arrangement of pixels with 12.5 mm vertical and horizontal spacing. By using positional pixel processing, the colors blend with their own pixel but the viewer's eyes also blend with the color produced by a neighboring pixel. With this type of interleaved layout, which can also be referred to as "pure pixel", a term which is in preferred use by Daktronics, Inc. of Brookings, S. Dak., each and every pixel and, therefore, each and every scan line is full color resulting in a blend of efficiency and accuracy having the capability to reproduce all the color depth and detail present in the original image signal. For example, a scan of line 35 of FIG. 7 involves the availability of four red LED elements, four green LED elements, and four blue LED elements of the pixels 35A, 35C, 35E and 35G. In a similar fashion, a scan of line 36 involves the availability of four red LED elements, four green LED elements, and four blue LED elements of the pixels 36B, 36D, 36F and 36H. Additional following scan patterns repeatingly exhibit the same characteristics where, preferably, an even and balanced red, green, and blue color representation exists with reference to the scan lines of the interleaved pixel arrangement shown in a manner such as previously described with reference to FIG. 3. It is noted that the interleaved pixel arrangement of FIG. 7, like the "true pixel" arrangement of FIG. 4, includes scan lines of full color representation.

MODE OF OPERATION

Figure 8:
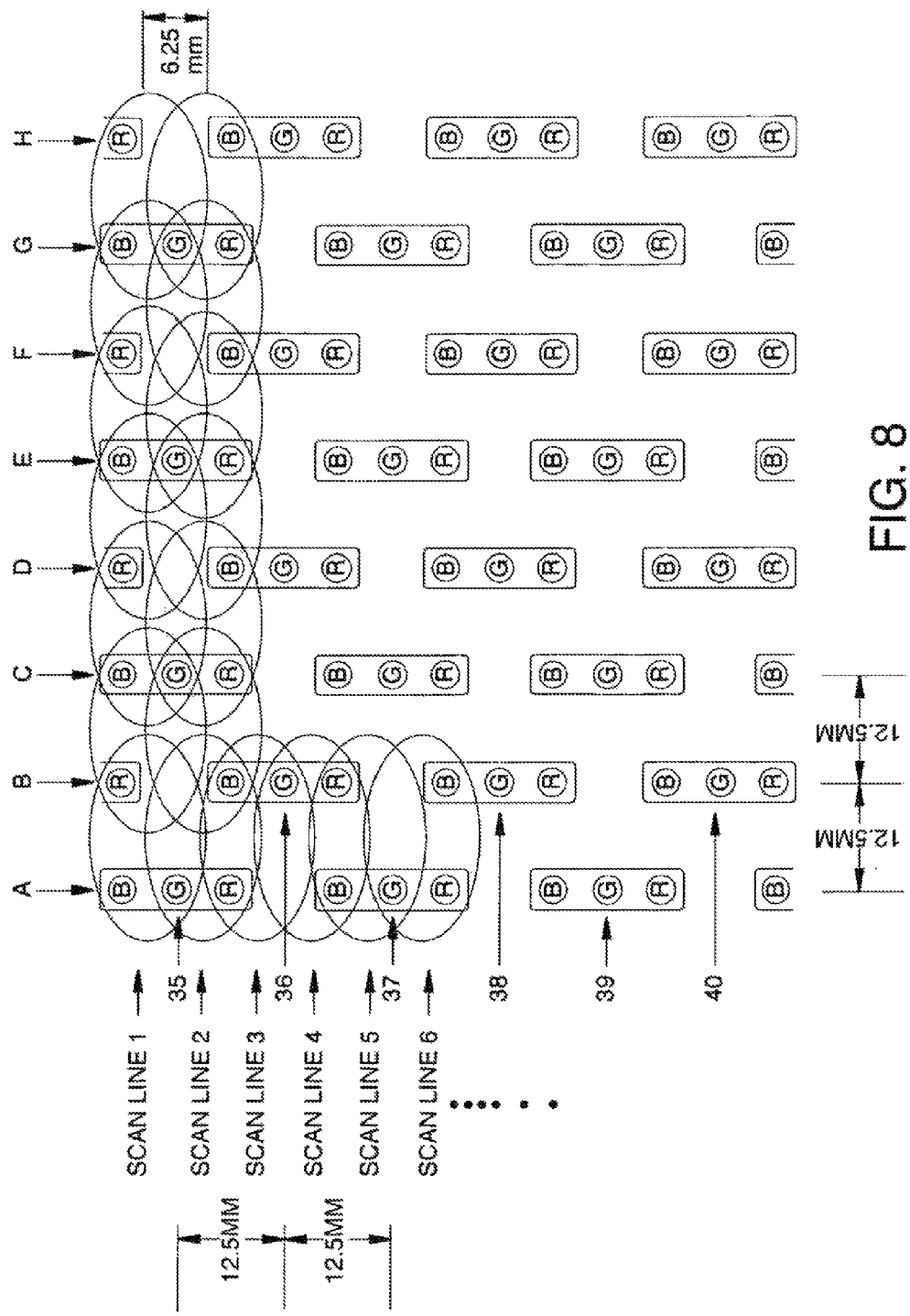
FIG. 8 illustrates resolution enhancement such as offered by interleaving.

FIG. 8 illustrates resolution enhancement such as offered by interleaving, such as shown in FIG. 7. Individual control of red, green, and blue LEDs is exercised over each individual red, green, or blue LED regardless of the native pixel in which each is contained. Such control includes, but is not limited to, operating, or not operating the desired colored individual LED and operation of an individual LED at a desired intensity. Individual red, green, and blue LEDs are grouped in real time to increase the perceived line count and overall resolution of a high definition electronic sign display. Such a sub-pixel processing method effectively doubles the native full-color count of the display to deliver smoother curves and greater image detail. Interleaved scanning is used to produce a set of alternating scan lines that are odd or even numbered. Consider scan line 1 (an odd number scan line) and scan line 2 (an even number scan line) during positional pixel processing where the human eye visually and temporally combines LED colors perceived in a 720 line frame. In scan line 1, the colors of a complete group of red green, and blue LEDs are perceived to be located as shown encircled by an ellipse albeit the LEDs reside in different native pixels, i.e., the blue and green LEDs of pixel 35A and the red LED of the partial pixel above pixel 36B are involved. This sequence repeats along scan line 1 and the other odd scan lines where each incremental portion of each scan line includes red, blue and green LEDs. Immediately following a full scan along scan line 1 and all following odd scan lines, another scan along scan line 2, and all following even scan lines, are initiated beginning with the green and red LEDs of pixel 35A and the blue LED of pixel 36B. The very next scan of line 2 proceeds to another complete group of red, green, and blue LEDs involving the blue LED of pixel 36B and the green and red LEDs of pixel 35C. This sequence repeats along scan line 2 where each incremental portion of scan 2 includes red, green, and blue LEDs until completing a full scan of even numbered scan lines. Hence, scan line 1 is painted on using the image information from the scan line 1 of the incoming image, and scan line 2 is painted on with the information from scan line 2 of the incoming image. The shared green LED in this example is imbued with information from both scan line 1 and scan line 2 in relation to the position of this shared green LED. The positional information involves a combination of an interpolated site (weighted average), as well as filters, to remove false color artifacts. Consider scan line 2 and scan line 3, the red and blue LEDs are shared devices on these two lines. The information used to drive these LEDs is a weighted average of the incoming scan lines 2 and 3 with the weighting of the average oriented to the location of these red and blue LEDs. The weighted averaging is performed before transmission of data to the display. To minimize the transmission overhead of the extra information of the shared devices, the green LEDs that are shared on scan lines 1 and 2 are transmitted as part of the information for the blue and red LEDs of scan line 1. The positional image information that is shared on the red and blue devices between scan lines 2 and 3 is transmitted with the information for the green LEDs on scan line 3. This decimation of transmitted data allows for control of the full color scan lines without increasing the transmission bandwidth. Although the pixels are vertically spaced at 12.5 mm each, scan line centers at 6.25 mm spacing where each scan line includes a full compliment of red, green, and blue LEDs as opposed virtual/dynamic pixel arrangements which lack in full color complements for each scan line. Scanning continues in this sequence along the entire frame to achieve 720 scan lines of full red, green, and blue color resolution. Arranging the pixels in interleaving fashion provides spacing which prevents side angle color shift that occurs when LEDs are packed very closely together and creates situations where the plastic lens of LED devices shoulders and blocks the light of other LEDs. The positional pixel processing technology can also be applied to the pixel interleaving configuration 10a shown and described starting in FIG. 1.

Figure 9:
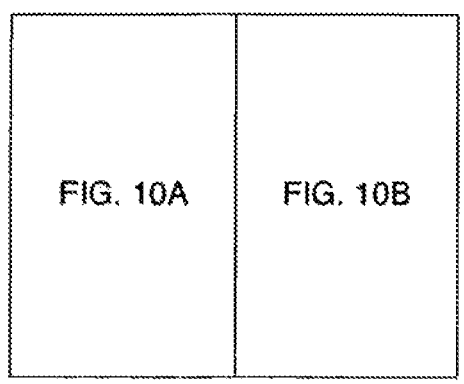
FIG. 9 illustrates the alignment of FIGS. 10A and 10B.
Figure 10A:
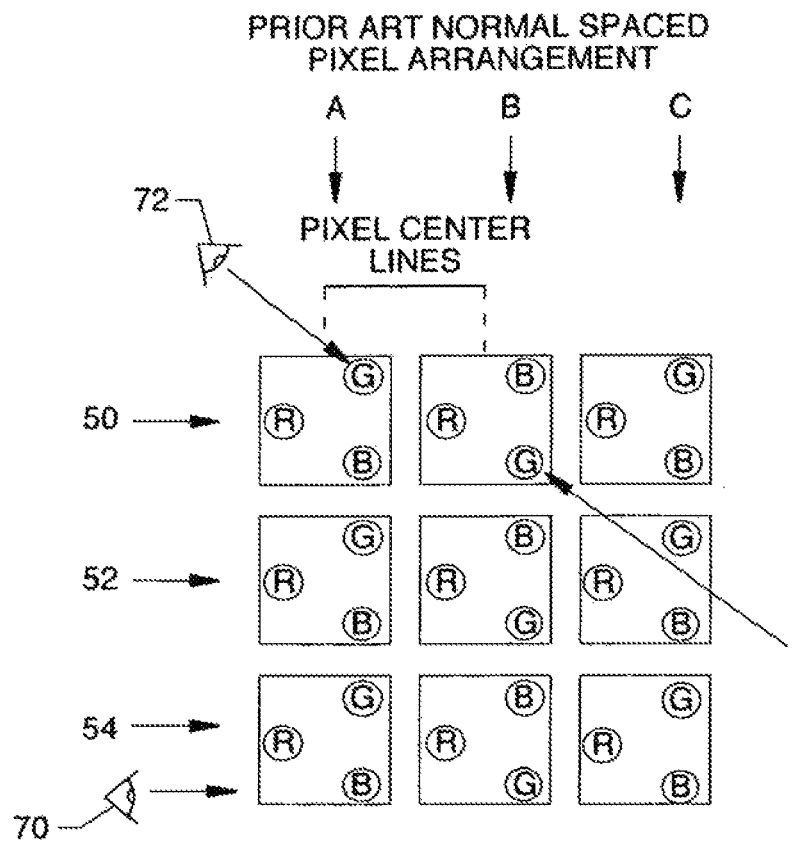
FIGS. 10A and 10B illustrate prior art nominally spaced pixel arrangements and interleaved wide spaced pixel arrangements and unrestricted available LED view path angles.
Figure 10A:
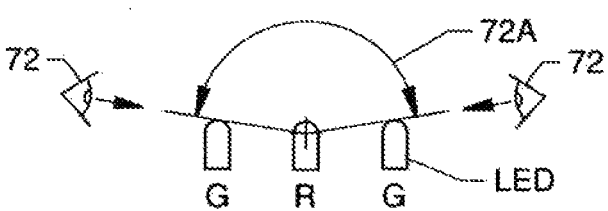
Figure 10A:
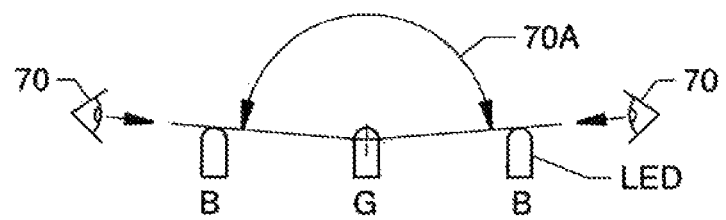
Figure 10B:
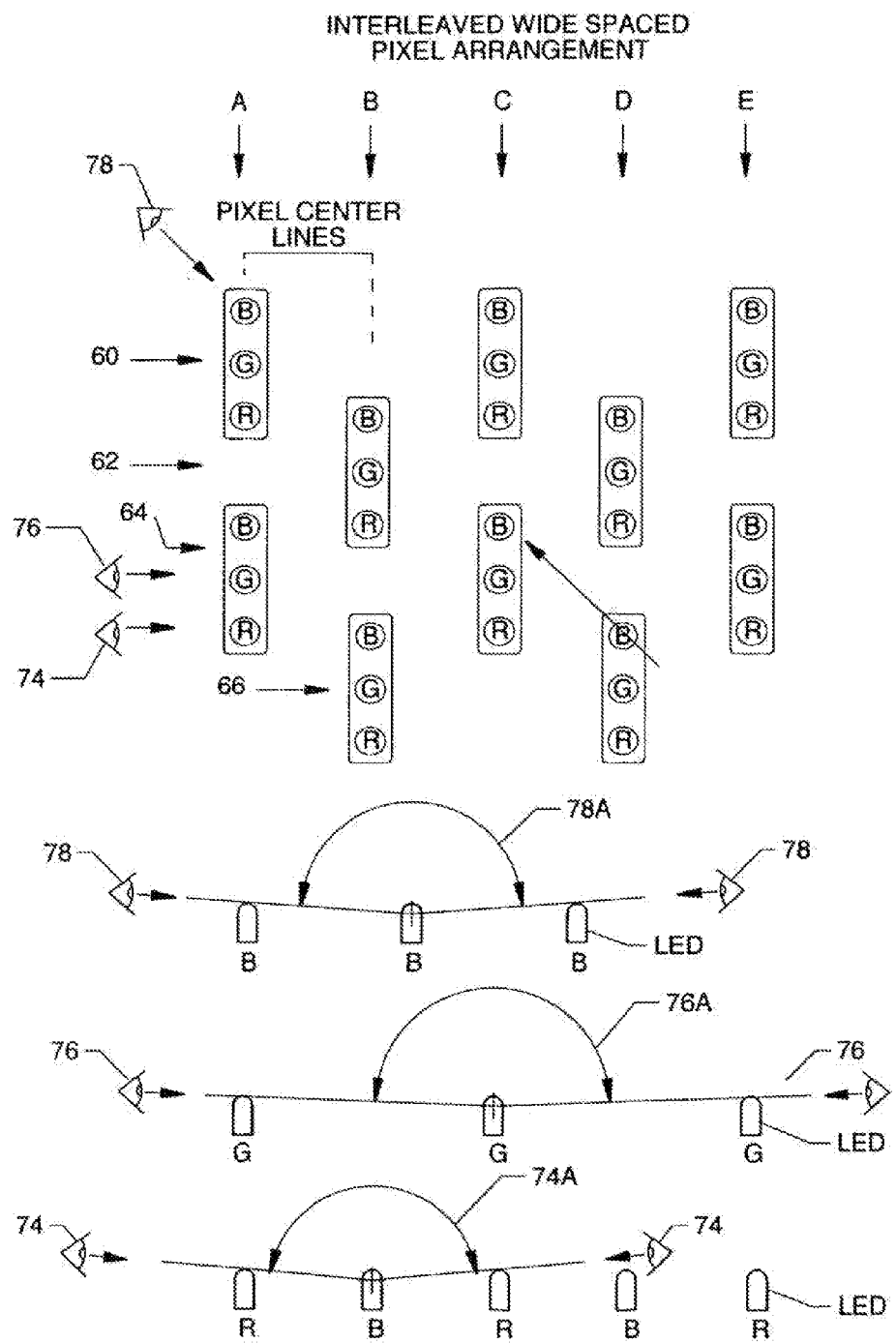

FIG. 9 illustrates the alignment of FIGS. 10A and 10B.

Viewability involving the use of interleaved pixels is also considered where increased viewability is afforded the viewer from viewing positions other than straight-on views by the use of interleaved pixels. Some views which enhance viewability include horizontal side viewing positions from the side and front of the pixels. Other views which enhance viewability are offset downward or upward viewing positions which are angular to and in front of the pixels. Viewability of other than straight-on views is influenced by the spacing between LEDs comprising neighboring pixels where wide spacing between LEDs of neighboring pixels increases viewability. The use of closely arranged pixels of prior art devices somewhat hampers viewability of other than straight-on views because viewing of one LED is blocked by another LED which is in the same line of sight.

FIG. 10A illustrates prior art spaced pixel arrangement as well as side views below showing an unrestricted available LED view path angle, and FIG. 10B illustrates interleaved wide spaced pixel arrangement as well as side views below showing an unrestricted available LED view path angle. The unrestricted available LED view path angle is represented by the included angle from the center point of a middle LED to the curved end of an LED to one side of the middle LED and from the center point of the middle LED to the curved end of an LED to the other side of the middle LED which can be seen unrestricted by a sign observer.

In FIG. 10A, a left offset viewing position 70 is established and displaced to the front and side of the pixels 54A-54C to observe the angular unrestricted available LED view path 70A shown below. The manner of sighting used throughout FIGS. 10A and 10B is typified in an example as follows. The left offset viewing position 70 sights along the blue LED of pixel 54A, the green LED of pixel 54B and the blue LED of pixel 54C, whereby the light emission of the green LED of pixel 54B (middle) is not restricted by the presence of the blue LED of the pixel 54A. The converse would be true if viewed from the right side wherein light emission of the green LED of pixel 54B is not restricted by the presence of the blue LED of the pixel 54C.

In FIG. 10A, a left offset upward viewing position 72 is established and displaced upwardly and to the front and side of the pixels 50A and 50B to observe the angular unrestricted available LED view path 72A, including the green LED of pixel 50A, the red LED of pixel 50B (middle), and the green LED of pixel 50B which are sighted along in the manner previously described.

In FIG. 10B, a left offset viewing position 74 is established and displaced to the front and side of the pixels 64A, 66B, 64C, 66D and 64E to observe the angular unrestricted available LED view path 74A, including the red LED of pixel 64A, the blue LED of pixel 66B (middle), the red LED of pixel 64C, the blue LED of pixel 66D, and the red LED of pixel 66E which are sighted along in the manner previously described.

In FIG. 10B, a left offset viewing position 76 is established and displaced to the front and side of the pixels 64A, 64C and 64E to observe the angular unrestricted available LED view path 76A, including the green LED of pixel 64A, the green LED of pixel 66C (middle), and the green LED of pixel 64E which are sighted along in the manner previously described. In this example, there is not a view restricting LED in columns B or D, whereby the spacing between the respective LEDs is considerably wider than that described in the prior art, thereby providing an unrestricted available LED view path angle 76A greater than and superior to that of the prior art. The unrestricted available LED view path angle 78A can range up to 150°.

In FIG. 10B, a left offset upward viewing position 78 is established and displaced upwardly and to the front and side of the pixels 60A, 62B and 64C to observe the angular unrestricted available LED view path 78A, including the blue LED of pixel 60A, the blue LED of pixel 62B (middle), and the blue LED of pixel 64C which are sighted along in the manner previously described. In this example, the spacing between the respective LEDs is considerably wider than that described in the prior art, thereby providing an unrestricted available LED view path angle 78A greater than and superior to that of the prior art. Providing greater unrestricted available LED view path angles for the interleaved pixels provides better viewability in many respects favoring the use of the wider spaced interleaved pixels over the use of the smaller spaced prior art spaced pixel arrangement. The unrestricted available LED view path angle 78A can range up to 140° or greater.

Various modifications can be made to the present invention without departing from the apparent scope thereof.

What is claimed is:

1. An electronic display device comprising:
   a plurality of light-emitting pixels, each light-emitting pixel having:
   one blue light-emitting element, one green light-emitting element, and one red light-emitting element associated therewith,
   with the one blue light-emitting element, one green light-emitting element, and one red light-emitting element of each light-emitting pixel being spaced from and in alignment with each other in a first direction,
   wherein, for each light-emitting pixel, a first one of the blue light-emitting element, the red light-emitting element, or the green light-emitting element is in a first end position of the light-emitting pixel, a second one of the blue light-emitting element, the red light-emitting element, or the green light-emitting element is in a second end position of the light-emitting pixel, and a third one of the blue light-emitting element, the red light-emitting element, or the green light-emitting element is in a middle position of the light-emitting pixel and equally spaced from both the first one and the second one of the blue light-emitting element, the red light-emitting element, or the green light-emitting element of the light-emitting pixel;
   a first electronically scannable line comprising a first plurality of the light-emitting pixels equally spaced in a second direction that is perpendicular to the first direction; and
   a second electronically scannable line comprising a second plurality of the light-emitting pixels equally spaced in the second direction, the second electronically scannable line being spaced in the first direction in an interleaved manner with respect to the first electronically scannable line such that:
   the first one of the blue light emitting element, the red light-emitting element, or the green light-emitting element of each light-emitting pixel in the second electronically scannable line is in alignment in the second direction with the second one of the blue light-emitting element, the red light-emitting element, or the green light-emitting element of each light-emitting pixel in the first electronically scannable line,
   the third one of the blue light-emitting element, the red light-emitting element, or the green light-emitting element of each light-emitting pixel in the first electronically scannable line are in alignment in the second direction with each other,
   the third one of the blue light-emitting element, the red light-emitting element, or the green light-emitting element of each light-emitting pixel in the second scannable line is in alignment in the second direction with each other; and
   the third one of the blue light-emitting element, the red light-emitting element, or the green light-emitting element do not have an obstructing light-emitting element in the second direction in an adjacent scannable line, wherein the third one of the blue light-emitting element, the red light-emitting element, or the green light-emitting element of each of the light-emitting pixels has a view path in a plane in the second direction of up to about 150° due to the lack of an obstructing light-emitting element in the second direction in adjacent scannable lines and wherein the first one and the second one of the blue light-emitting element, the red light-emitting element, or the green light-emitting element of each light-emitting pixel has a view path in an angled plane up to about 140° due to increased spacing between offset situated light-emitting elements in adjacent scannable lines;

wherein successive electronically scannable lines have the same physical spatial relationship as the first and second electronically scannable lines such that each successive scannable line is interleaved with its preceding scannable line; and wherein the number of the plurality of electronically scannable lines and the number of pixels in each of the electronically scannable lines is sufficient to provide a predetermined display area.

2. The electronic display device of claim 1, wherein the green light-emitting element is in the middle position of each light-emitting pixel.

3. The electronic display device of claim 2, wherein the blue light-emitting element is in the first end position and the red light-emitting element is in the second end position of each light-emitting pixel.

4. The electronic display device of claim 1, wherein the electronically scannable lines of the light-emitting pixels are spaced, in the first direction, about 12.5 mm on center.

5. The electronic display device of claim 1, wherein the light-emitting pixels are spaced, in the second direction, about 12.5 mm on center.

6. The electronic display device of claim 1, wherein the first direction is a generally vertical direction, the second direction is a generally horizontal direction, the first end position is a top position in each of the light-emitting pixels, and the second end position is a bottom position in each of the light-emitting pixels.

7. The electronic display device of claim 1, wherein the light-emitting elements comprise light-emitting diodes.

8. An electronic display device comprising:
a plurality of electronically scannable lines of light-emitting pixels, the plurality of scannable lines having alternately even-numbered scannable lines and odd-numbered scannable lines;
each of the plurality light-emitting pixels having:
three light-emitting elements associated therewith, including one blue light-emitting element, one green light-emitting element, and one red light-emitting element, the three light-emitting elements in each light-emitting pixel being spaced from and in alignment with each other in a first direction,
wherein, for each light-emitting pixel, a first one of the blue light-emitting element, the red light-emitting element, or the green light-emitting element of the light-emitting pixel is in a first end position of the light-emitting pixel, a second one of the blue light-emitting element, the red light-emitting element, or the green light-emitting element is in a second end position of the light-emitting pixel, and a third one of the blue light-emitting element, the red light-emitting element, or the green light-emitting element is in a middle position of the light-emitting pixel and is equally spaced from both the first one and the second one of the blue light-emitting element, the red light-emitting element, or the green light-emitting element;

wherein each of the even-numbered scannable lines includes a first plurality of the light-emitting pixels spaced in a second direction that is perpendicular to the first direction and each of the odd-numbered scannable lines includes a second plurality of the light-emitting pixels spaced in the second direction;

wherein each of the odd-numbered electronically scannable lines is spaced in an interleaved manner with respect to each of the even-numbered electronically scannable lines so that:
the first one of the blue light-emitting element, the red light-emitting element, or the green light-emitting element of each light-emitting pixel in one of the odd-numbered electronically scannable line lines is in alignment in the second direction with the second one of the blue light-emitting element, the red light-emitting element, or the green light-emitting element of each light-emitting pixel in an adjacent even-numbered electronically scannable line,
the third one of the blue light-emitting element, the red light-emitting element, or the green light-emitting element of the light-emitting pixels in each of the even-numbered electronically scannable lines are in alignment with each other in the second direction,
the third one of the blue light-emitting element, the red light-emitting element, or the green light-emitting element of the light-emitting pixels in each of the odd-numbered scannable lines are in alignment with each other in the second direction; and
the third one of the blue light-emitting element, the red light-emitting element, or the green light-emitting element do not have an obstructing light-emitting element in the second direction in an adjacent scannable line,
wherein the third one of the blue light-emitting element, the red light-emitting element, or the green light-emitting element of each of the light-emitting pixels has a view path in a plane in the second direction of up to about 150° due to the lack of an obstructing light-emitting element in the second direction in adjacent scannable lines and wherein the first one and the second one of the blue light-emitting element, the red light-emitting element, or the green light-emitting element of each light-emitting pixel has a view path in an angled plane up to about 140° due to increased spacing between offset situated light-emitting elements in adjacent scannable lines;

wherein successive electronically scannable lines have the same physical spatial relationship as the even-numbered and odd-numbered electronically scannable lines such that each successive scannable line is interleaved with its preceding scannable line, and wherein the number of the plurality of electrically scannable lines and the number of the light-emitting pixels in each of the electronically scannable lines are sufficient to provide a predetermined display area.

9. The electronic display device of claim 8, wherein the green light-emitting element is in the middle position of each light-emitting pixel.

10. The electronic display device of claim 9, wherein the blue light-emitting element is in the first end position and the red light-emitting element is in the second end position of each light-emitting pixel.

11. The electronic display device of claim 8, wherein the electronically scannable lines of light-emitting pixels are spaced, in the first direction, about 12.5 mm on center.

12. The electronic display device of claim 8, wherein the light-emitting pixels are spaced, in the second direction, about 12.5 mm on center.

13. The electronic display device of claim 8, wherein the first direction is a generally vertical direction, the second direction is a generally horizontal direction, the first end position is a top position in each of the light-emitting pixels, and the second end position is a bottom position in each of the light-emitting pixels.

14. The electronic display device of claim 8, wherein the light-emitting elements comprise light-emitting diodes.

15. A pixel interleave configuration for an electronic sign, the pixel interleave configuration comprising:
a plurality of light-emitting pixels each comprising one blue light-emitting element, one red light-emitting element, and one green light-emitting element, each of the light-emitting pixels having, in an arrangement in a first direction:
a first one of the blue light-emitting element, the red light-emitting element, or the green light-emitting element situated at a first end position in the first direction,
a second one of the blue light-emitting element, the red light-emitting element, or the green light-emitting element situated at a second end position in the first direction, and
a third one of the blue light-emitting element, the red light-emitting element, or the green light-emitting element situated at a middle position between the first one and the second one of the blue light-emitting element, the red light-emitting element, or the green light-emitting element,
the light-emitting pixels arranged in rows of regularly spaced apart light-emitting pixels, the rows being oriented in a second direction that is perpendicular to the first direction, the rows alternatingly defining odd and even rows of the light-emitting pixels, and the light-emitting pixels further arranged in columns of regularly spaced apart light-emitting pixels oriented in the first direction, the columns alternatingly defining odd and even columns, wherein:
the even columns being offset relative to the odd columns, such that the even columns are displaced in the first direction by about half of the spacing between light-emitting pixels of the even columns, relative to the light-emitting pixels of the odd columns,
the even rows being offset relative to the odd rows, such that the even rows are displaced in the second direction by about half of the spacing between light-emitting pixels of the rows, relative to the light-emitting pixels of the odd rows, and with each light-emitting pixel of the plurality of light-emitting pixels having a row and a column address:
the first one of the blue light emitting element, the red light-emitting element, or the green light-emitting element of each light-emitting pixel in the even rows is in alignment in the second direction with the second one of the blue light-emitting element, the red light-emitting element, or the green light-emitting element of the light-emitting pixels in an adjacent odd row,
the third one of the blue light-emitting element, the red light-emitting element, or the green light-emitting element of the light-emitting pixels in the odd rows are in alignment in the second direction with each other,
the third one of the blue light-emitting element, the red light-emitting element, or the green light-emitting element of the light-emitting pixel in the even rows are in alignment in the second direction with each other, and
the third one of the blue light-emitting element, the red light-emitting element, or the green light-emitting element do not have an obstructing light-emitting element in the second direction in an adjacent row,
wherein the third one of the blue light-emitting element, the red light-emitting element, or the green light-emitting element of each of the light-emitting pixels has a view path in a plane in the second direction of up to about 150° due to the lack of an obstructing light-emitting element in the second direction in adjacent rows and wherein the first one and the second one of the blue light-emitting element, the red light-emitting element, or the green light-emitting element of each light-emitting pixel has a view path in an angled plane up to about 140° due to increased spacing between offset situated light-emitting elements in adjacent rows;
wherein the blue light-emitting element, the red light-emitting element, and the green light-emitting element of each of the light-emitting pixels are sequentially addressed and controlled by scan lines in the first direction that are separated by about half an light-emitting pixel spacing of an light-emitting pixel column, such that each light-emitting pixel has the blue light-emitting element, the red light-emitting element, and the green light-emitting element addressed in at least two distinct scan lines, the scan lines sequentially scanningly activated according to an image to be displayed; and
wherein each of the scan lines defines real time pixels along each scan line, each real time pixel consisting of one of the blue light-emitting elements, one of the red light-emitting elements, and one of the green light-emitting elements, at least one of the blue light-emitting element, the red light-emitting element, or the green light-emitting element of each real time pixel resides on an light-emitting pixel adjacent to the light-emitting pixel on which the other light-emitting elements of the real time pixel reside and at least one of the two adjacent light-emitting pixels is in an offset column of light-emitting pixel.

16. The electronic display device of claim 15, wherein the electronically scannable lines of light-emitting pixels are spaced, in the first direction, about 12.5 mm, on center.

17. The electronic display device of claim 15, wherein the light-emitting pixels are spaced, in the second direction, about 12.5 mm on center.

18. The electronic display device of claim 15, wherein the first direction is a generally vertical direction, the second direction is a generally horizontal direction, the first end position is a top position in each of the light-emitting pixels, and the second end position is a bottom position in each of the light-emitting pixels.

* * * * *